US009811616B2

(12) United States Patent
Pena et al.

(10) Patent No.: US 9,811,616 B2
(45) Date of Patent: Nov. 7, 2017

(54) ANALYSIS OF A STRUCTURE MODELED WITH INTRAPLY INTERFACE ELEMENTS

(71) Applicant: The Boeing Company, Huntington Beach, CA (US)

(72) Inventors: Gerardo Pena, Seattle, WA (US); Jeffrey B. Gavin, Bellevue, WA (US); Jeffrey P. Baucum, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 620 days.

(21) Appl. No.: 14/503,960

(22) Filed: Oct. 1, 2014

(65) Prior Publication Data
US 2016/0098503 A1    Apr. 7, 2016

(51) Int. Cl.
*G06F 17/50*    (2006.01)

(52) U.S. Cl.
CPC ...... *G06F 17/5018* (2013.01); *G06F 2217/44* (2013.01)

(58) Field of Classification Search
CPC .............................. G06F 17/50; G06F 17/5009
USPC ........................................................ 703/1, 6
See application file for complete search history.

(56) References Cited

U.S. PATENT DOCUMENTS

| 7,505,885 B2 | 3/2009 | Deobald et al. |
| 7,979,257 B2 | 7/2011 | Yu et al. |
| 8,494,819 B2 * | 7/2013 | Hallquist ............ G06F 17/5018 703/1 |
| 2009/0144038 A1 * | 6/2009 | Rassaian .................. G01N 3/32 703/6 |
| 2011/0015905 A1 * | 1/2011 | Gull ..................... G06F 17/5018 703/2 |
| 2015/0259580 A1 * | 9/2015 | Nguyen ..................... C08J 5/24 523/436 |

OTHER PUBLICATIONS

Johnson, "Interface Finite Elements for the Analysis of Fracture Initiation and Progression," Final Report—Summary of Research, Aerospace and Ocean Engineering Department, Virginia Polytechnic Institute and State University, Jun. 2003, 6 pages.

* cited by examiner

*Primary Examiner* — Andy Ho
(74) *Attorney, Agent, or Firm* — Womble Carlyle Sandridge & Rice LLP (57) ABSTRACT

A method of analyzing a structure includes producing a finite element model of the structure having fibers embedded therein, and including one or more plies. This may include performing a discretization of a digital model of the structure in which each ply of the one or more plies is represented by a mesh of finite elements aligned with a direction of uni-directional fibers embedded in the ply. Producing the finite element model may also include adding a fiber-aligned intraply interface element between selected adjacent finite elements in the mesh of each ply to capture potential intraply failure modes. And the method may include performing a finite element method (FEM) failure analysis of the finite element model under a load, with the FEM failure analysis producing an output that indicates an extent of any of the potential intraply failure modes that result from the finite element model under the load.

21 Claims, 11 Drawing Sheets

ANALYSIS OF A STRUCTURE MODELED WITH INTRAPLY INTERFACE ELEMENTS

TECHNOLOGICAL FIELD

The present disclosure relates generally to structural finite element analysis and, in particular, to progressive failure analysis of a structure modeled with intraply interface elements.

BACKGROUND

Advances in software-based tools such as progressive failure analysis (PFA) tools to predict structural failure of laminated composite parts have enabled replacing expensive tests with simulations. But one of the challenges that these PFA tools have yet to overcome is that accuracy of the simulations must be demonstrated for a broad design space, test type and loading conditions. This includes correctly idealizing failure modes known to affect the failure load of a coupon during testing.

As an example, consider composites of unidirectional tape plies, a common material ply in which fibers are aligned in a single direction and imbedded in a matrix of epoxy resin. Individual plies with unique orientations are stacked together and cured to form a single laminated part. The failure load of such laminates depends not only on the response of each individual ply during loading but also interactions between them. These interactions include matrix failure modes that result from separation at the ply interfaces during loading (inter-laminar delamination), as well as fibers coming apart within a ply (intra-laminar failure).

A number of PFA tools are capable of addressing inter-laminar delamination. But there is no comparable way to deal with intra-laminar failure. It may therefore be desirable to have an apparatus and method that takes into account at least some of the issues discussed above, as well as possibly other issues.

BRIEF SUMMARY

Example implementations of the present disclosure provide an improved apparatus and method for analyzing a structure using finite element method (FEM) analysis of a finite element model of the structure in which its plies may be represented by meshes of finite elements. Example implementations provide a meshing scheme that improves the ability of simulations to correctly idealize the response of the structure by decoupling the two main classes of failure modes in the structure, namely, in the matrix and in the fiber. Example implementations align ply-level finite elements with the natural direction of the fiber, and add de-cohesive finite elements within plies (intraply interface elements) to capture potential intra-laminar failure modes, thereby producing a finite element model that has a more natural configuration and an increased likelihood of properly capturing the failure modes that may influence the final strength prediction.

According to one aspect of example implementations, a method is provided for analyzing a structure. The method includes producing a finite element model of the structure having fibers embedded therein, and including one or more plies. In some examples, the structure may include a plurality of fibers at least two of which have respective uni-directional fibers in different directions.

Producing the finite element model may include performing a discretization of a digital model of the structure in which each ply is represented by a mesh of finite elements aligned with a direction of uni-directional fibers embedded in the ply. According to example implementations, producing the finite element model may include adding an intraply interface element between selected adjacent finite elements in the mesh of each ply to capture potential intraply failure modes, with the intraply interface element being aligned with the direction of the uni-directional fibers embedded in the ply. And the method may include performing a finite element method (FEM) failure analysis of the finite element model under a load, with the FEM failure analysis producing an output that indicates an extent of any of the potential intraply failure modes that result from the finite element model under the load.

In some examples, the structure may include a plurality of plies, and producing the finite element model may further include adding an interply interface element between adjacent plies of each pair of adjacent plies to capture potential interply failure modes. And in some further examples, the intraply interface element has one or more properties that are different from one or more properties of the interply interface element. The output of the FEM failure analysis may then further indicate an extent of any of the potential interply failure modes that result from the finite element model under the load.

In some examples, the digital model of the structure may define a void (e.g., hole, notch) that extends through the each ply of the one or more plies, and the mesh of each ply may define a corresponding void therein. In some further examples, the finite elements of the mesh may be with the direction of the uni-directional fibers and without regard to the corresponding void in the mesh. In these examples, one or more intraply interface elements may be added about the corresponding void in the mesh of each ply.

In some examples, the direction of the uni-directional fibers for each ply may be parallel to a principal axis of a local coordinate system of the ply. In these examples, performing the discretization of the digital model may include generating a grid of finite elements each of which has edges aligned with directions of respective orthogonal axes of a global coordinate system. The grid of finite elements may be overlayed with surfaces that define a boundary of the ply, with the surfaces being aligned at an angle that is the negative of any angular offset of the principal axis of the local coordinate system from a corresponding one of the respective orthogonal axes of the global coordinate system. Those elements that are at least partially outside the boundary of the ply may be removed from the grid of finite elements those, thereby producing a coarse mesh of the ply. The coarse mesh may be stitched to the boundary of the ply to produce the mesh for the ply. And the coarse mesh before the stitching, or the mesh after the stitching, may be rotated by the angular offset.

In other aspects of example implementations, an apparatus and computer-readable storage medium are provided for analyzing a structure. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Figure 1:
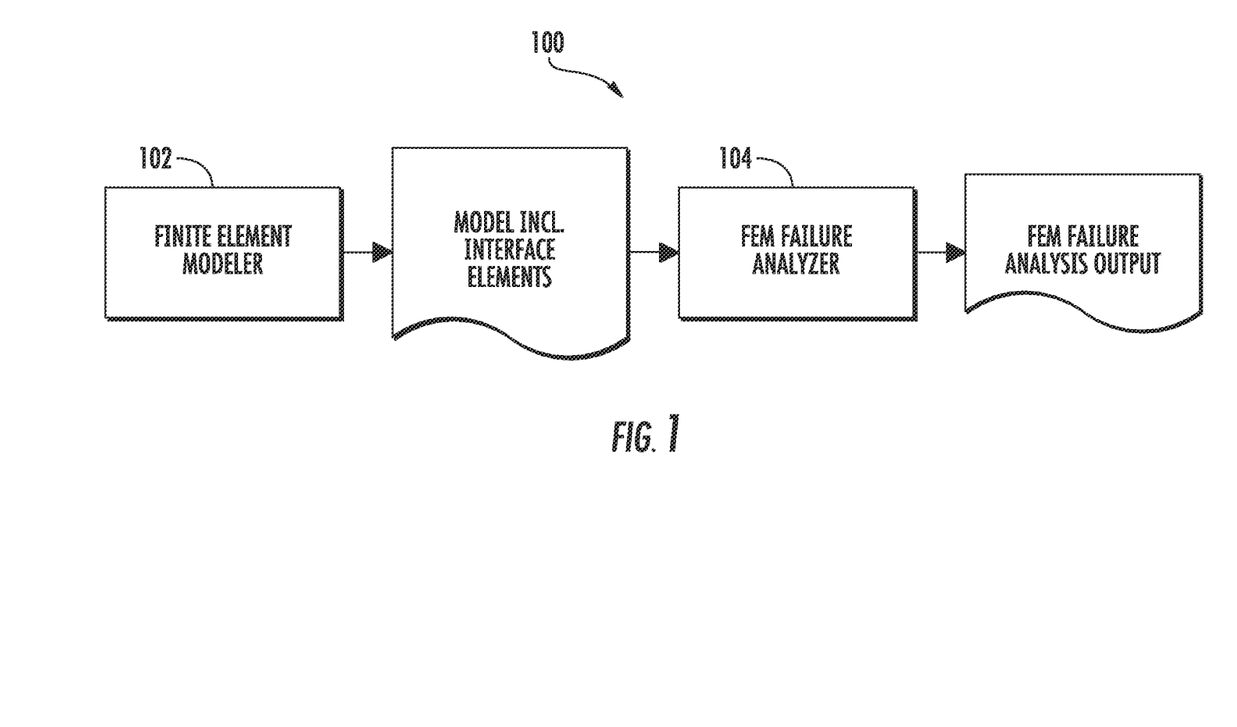
FIG. 1 is an illustration of a system for analyzing a structure, according to example implementations of the present disclosure.

FIG. 1 illustrates a system 100 for analyzing a structure according to various example implementations of the present disclosure. The structure may be any of a number of different structures composed of one or more plies, each of which in some examples may include fibers bound by a material often referred to as a matrix. Examples of suitable structures include composites, laminated composites and the like, such as laminated composites of unidirectional tape plies.

The system 100 may include any of a number of different subsystems (each an individual system) for performing one or more functions or operations with respect to a digital model of a structure such as a single or multiply structure, and a finite element model of the structure. As shown, for example, the system may include a finite element modeler 102 and a finite element method (FEM) failure analyzer 104. Although being shown together as part of the system, it should be understood that either or both of the finite element modeler and FEM failure analyzer may function or operate as a separate system without regard to the other. And further, it should be understood that the system may include one or more additional or alternative subsystems than those shown in FIG. 1.

The finite element modeler 102 may be configured to produce a finite element model of the structure including one or more plies each of which may be represented by a mesh of finite elements, which according to example implementations may be aligned with the direction of uni-directional fibers embedded in the ply. In some examples, the structure may include a plurality of plies, and in these examples, the plies of the plurality may include two or more that have respective uni-directional fibers in different directions.

In addition to the mesh of finite elements that represent each ply, the finite element model may include one or more intraply interface elements between adjacent finite elements in the mesh of each ply. The intraply interface element may in some examples be a zero-thickness finite element. The intraply interface element also be aligned with the direction of the fibers, and may capture potential intraply failure modes during failure analysis of the finite model. In this regard, the FEM failure analyzer 104 may be configured to perform a FEM failure analysis of the finite element model under a load. And this analysis may produce an output that indicates the extent of any of the potential intraply failure modes that result from the finite element model under the load.

The FEM failure analyzer 104 may be configured to perform any number of different FEM failure analyses of the finite element model. In some examples, the analysis may apply to any case of a laminated composite that is prone to a splitting mode. This may include a laminated composite with several layers of material oriented in the same direction. Or in other examples, it may include a laminated composite defining a void (e.g., hole, notch) in which a failure may initiate and propagate through the remainder of the composite along the axis of a fiber, either incrementally or as a catastrophic event. This failure mode may be identified through any visualization tool that shows the extent of the failed elements within the finite element model by probing an output variable that indicates whether an element has failed.

In some examples such as those involving a plurality of plies, the finite element model may further include an interply interface element between adjacent plies of each pair of adjacent plies in the plurality. The intraply interface element may have one or more properties that are different from one or more properties of the interply interface element. Examples of suitable properties include fracture properties, penalty stiffness and the like, but may depend on the particular FEM failure analysis performed on the finite element model. Similar to the intraply interface element, the interply interface element may in some examples be a zero-thickness finite element. The interply interface element may capture potential interply failure modes. In these examples, then, the output of the FEM failure analysis may further indicate the extent of any of the potential interply failure modes that result from the finite element model under the load. Similar to the intraply failure modes, in some examples, interply failure modes may be identified through any visualization tool that shows the extent of failed elements within the finite element model by probing an output variable that indicates whether an element has failed.

Figure 2:
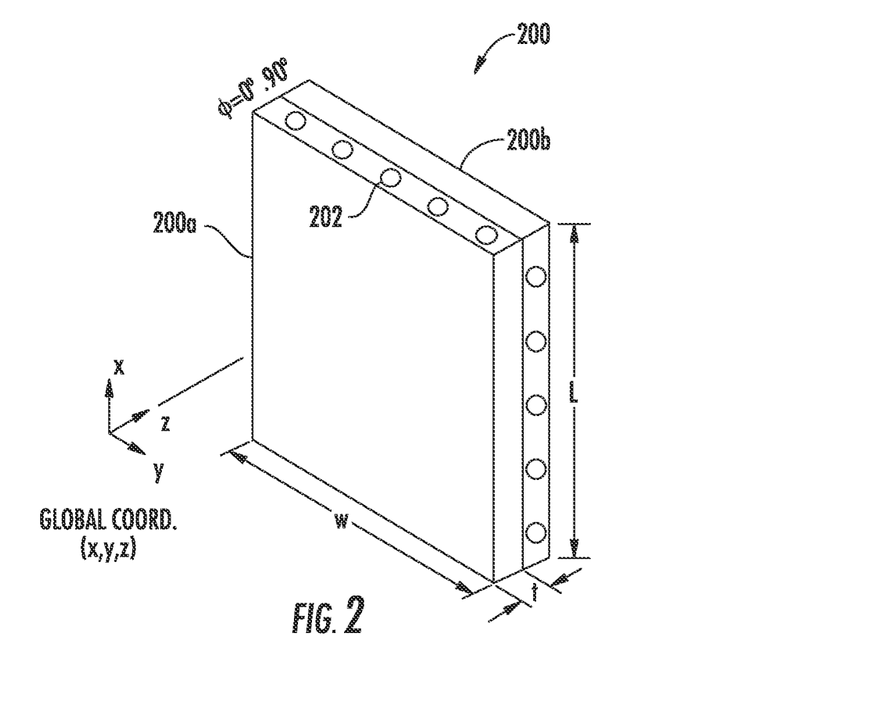
FIG. 2 illustrates an example of a multiply structure.
Figure 3:
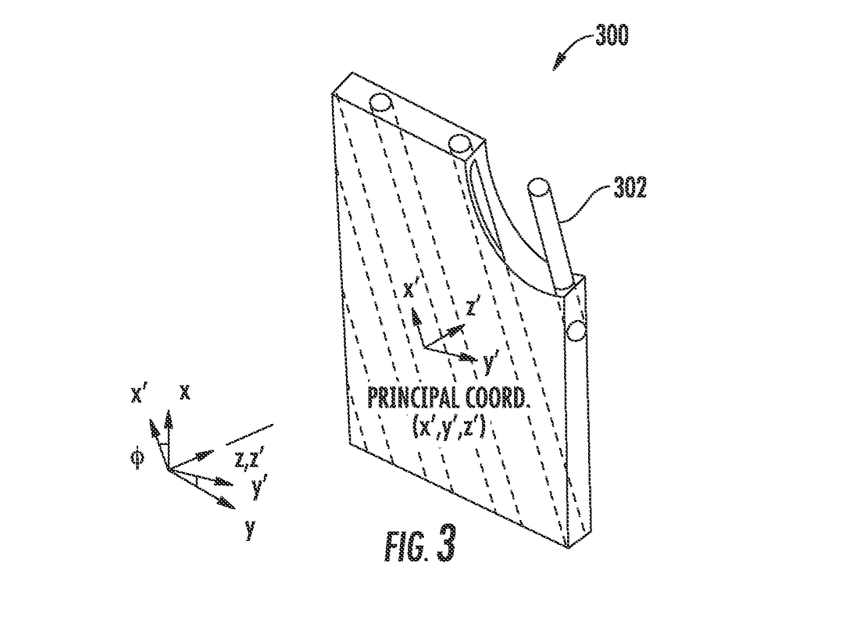
FIG. 3 illustrates a ply of a structure including one or more plies, according to some example implementations.

FIG. 2 illustrates an example of a multiply structure 200 including a plurality of plies with at least first and second plies 200a, 200b, and with reference to the global coordinate system. FIG. 3 illustrates an example of a ply 300 of a structure including one or more plies, and with reference to a local coordinate system (shown as principal coordinates) of the ply. As also shown, the plies may include embedded fibers 202, 302 oriented parallel to a principal axis (e.g., x'-axis) of the local coordinate system (x',y',z') of the ply. In FIGS. 2 and 3, the fibers are shown are shown fewer in number and closer in diameter to the thickness of the ply, but it should be understood that in other examples, the fibers may be significantly greater in number and much smaller in diameter. In some examples, the principal axes of different plies of a multiply structure may be the same or different, and the local coordinate system of either or both may have an angular offset ($\Phi$) from the global coordinate system. In FIG. 2, the fibers and thus the first principal axis of the first ply 200a may be aligned with the global coordinate system ($\Phi=0°$), while the fibers and thus the second principal axis of the second ply 200b may be offset from the global coordinate system ($\Phi=90°$).

Figure 4:
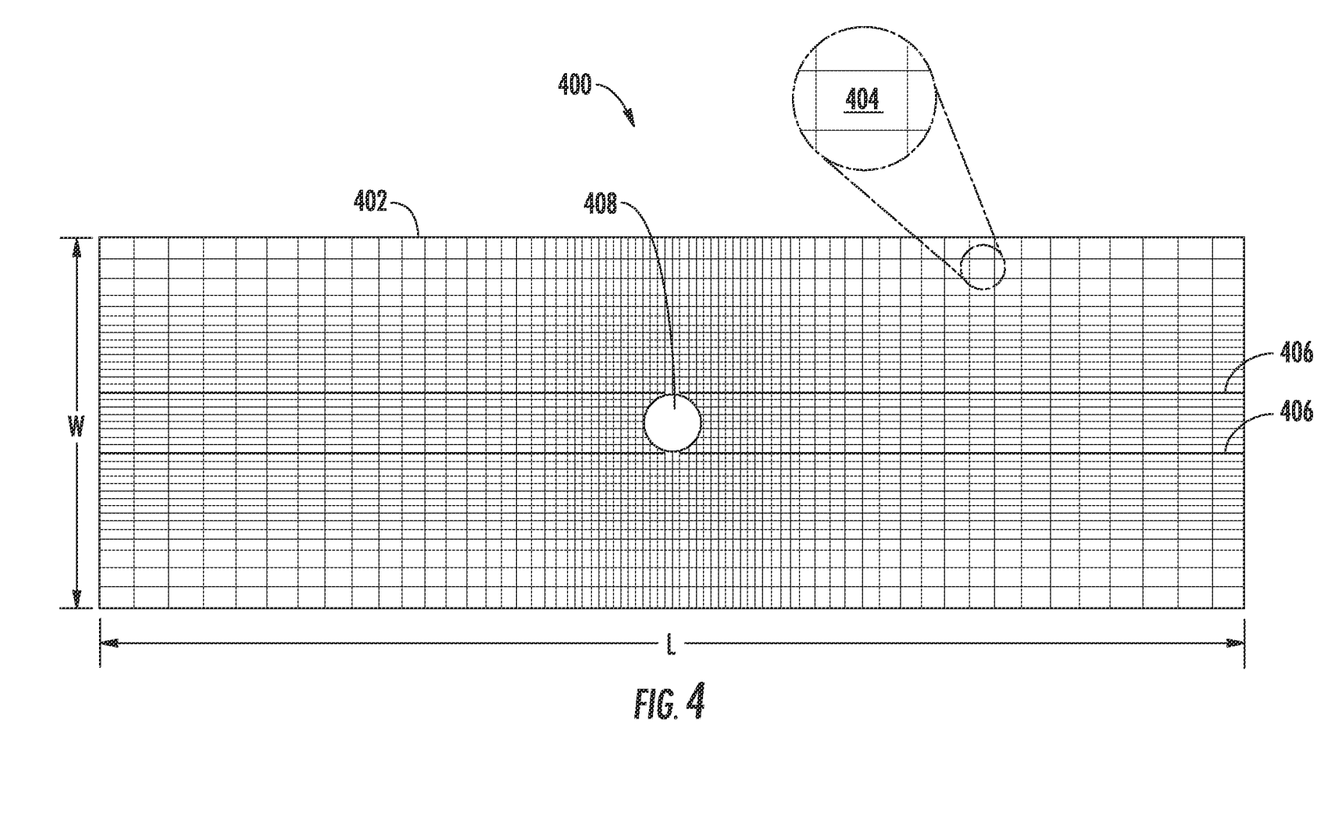
FIG. 4 illustrates a top view of a finite element model of a structure, showing more particularly the mesh that represents the ply of the single-ply structure or a topmost ply of a multiply structure, according to example implementations.

FIG. 4 illustrates a top view of a finite element model 400 of a structure, showing more particularly the mesh 402 that represents the ply of the single-ply structure or a topmost ply of a multiply structure. As shown, the mesh includes a plurality of finite elements 404 (only one of the finite elements being specifically called out in inset 4A). In FIG. 4, the ply includes embedded, uni-directional fibers, which with the first principal axis of the ply may be aligned with the global coordinate system ($\Phi=0°$). The finite elements are aligned with the direction of the fibers, and in the example of FIG. 4, are consequently also aligned with the global coordinate system.

The finite element model 400 also includes one or more intraply interface elements 406 between adjacent finite elements 404 in the mesh of each ply, and which may also be aligned with the direction of the fibers (e.g., $\Phi=0°$). The intraply interface elements may be positioned in any of a number of different manners to capture potential intraply failure modes during failure analysis of the finite model. In some examples, the digital model of the structure may define a void that extends through the each ply, and the mesh may define a corresponding void. This void may be a hole 408, notch or the like internal to or along an edge of the mesh, the elements of which may be aligned with the direction of the embedded fibers and without regard to the corresponding void. In some examples, the void may be about where an intraply failure may be expected, and consequently, the intraply interface elements may be added about the void, such as along tangents of the void as shown in FIG. 4. In other examples, the digital model of the structure and the mesh representation of its ply may not define a void; and the intraply interface elements may be simply added throughout the mesh between finite elements and aligned with the direction of the fibers.

Figure 5A:
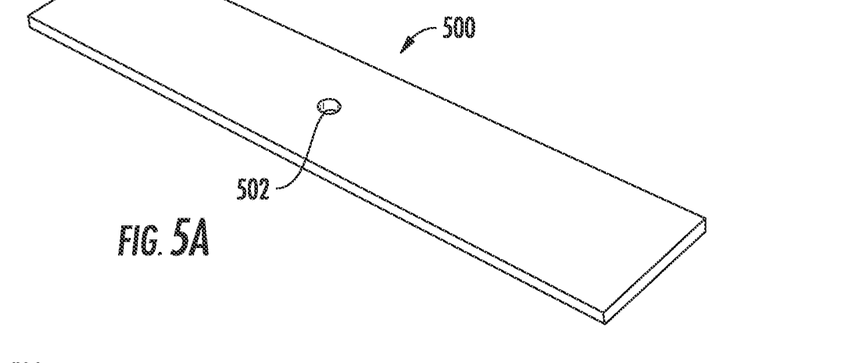
FIGS. 5A, 5B and 5C illustrate various stages in the production of a finite element model of a structure including a plurality of plies, according to one example implementation.
Figure 5B:
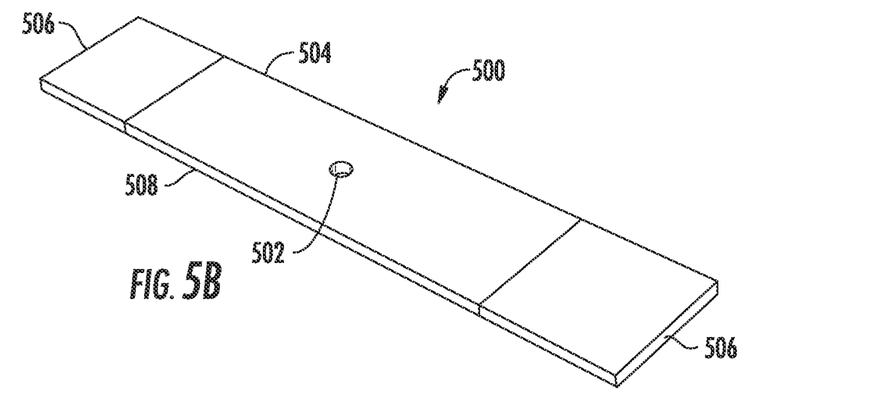
Figure 5C:
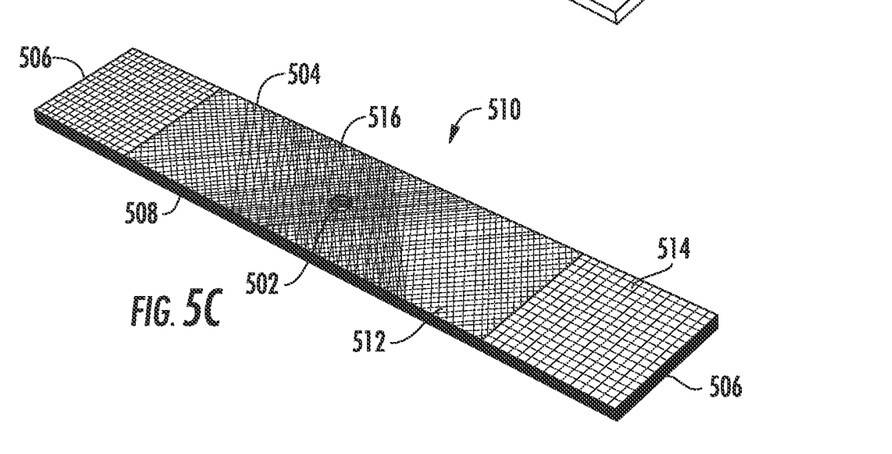

FIGS. 5A, 5B and 5C illustrate various stages in the production of a finite element model of a structure including a plurality of plies, according to one example implementation of the present disclosure. FIG. 5A illustrates a digital model 500 of a structure that shows the structure's geometry and including a hole 502 through the structure. As shown in FIG. 5B, in this example the structure may be divided into a central region 504 of interest in which the analysis may be concentrated, which may be bounded by far-field regions 506 of less interest that may be tied to the central region. Although the structure may include plies that span its length across the central region and far-field regions, the individual plies 508 may in some examples only be modeled in the central region, as also shown in FIG. 5B.

Focusing analysis on the central region 504 may be particularly useful in cases of a digital model 500 of a larger structure, or in which the region of more likely damage initiation and propagation is known to be smaller than the structure. This may ease the implementation and computational efficiency in producing and analyzing the corresponding finite element model.

As shown in FIG. 5C, the digital model 500 may be processed to produce a finite element model 510 of the structure. This may include a discretization of the digital model in which each ply 508 may be represented by a mesh of finite elements. As the individual plies in the illustrated example are only modeled in the central region 504, it may only be in this region in which the individual plies are represented by respective meshes of finite elements 512 aligned with a direction of uni-directional fibers embedded in the plies. The discretization in the far-field regions 506 may instead produce respective meshes of finite elements 514 that span the thickness of the digital model. A number of intraply interface elements 516 may be added between selected adjacent finite elements to capture potential intraply failure modes, here again in this example focused on the central region (between adjacent finite elements 512). And like the adjacent finite elements, these intraply interface elements may be aligned with the direction of the uni-directional fibers embedded in the ply (FIG. 5C illustrating intraply interface elements across multiple plies with fibers in different directions).

Although not separately shown in FIG. 5C, the finite element model 510 may further include added interply interface elements between adjacent plies 508 of pairs of adjacent plies to capture potential interply failure modes. In some examples, the plies may be tied to one another and to the interply interface elements using tie constraints to mimic bonding between the ties, which may be the case for structures such as laminated composites.

Boundary conditions may be introduced to the finite element model 510, such as apply a load to the model. This load may be any of a number of different types of loads depending on the particular analysis, but may include for example, tension, compression or the like. And also depending on the analysis, the intraply and interply interface elements may be assigned different respective properties such as fracture properties, penalty stiffness and the like. The FEM failure analysis may then be performed on the finite element model under the applied load, as described above.

Figure 6:
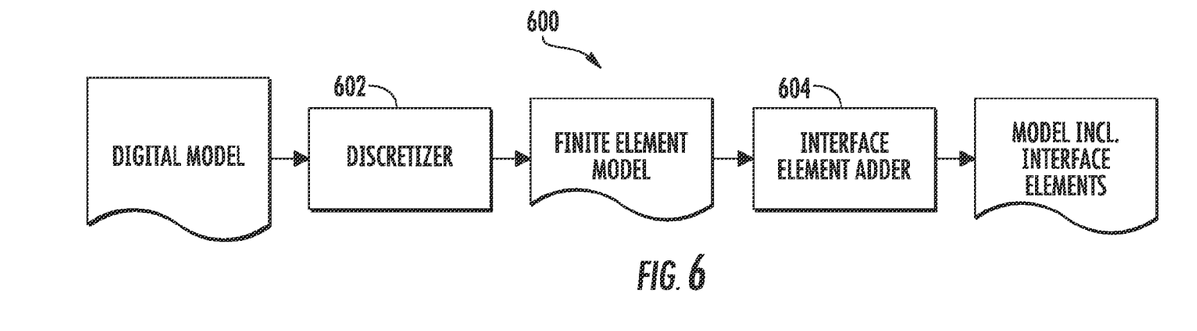
FIGS. 6 and 7 illustrate respectively a finite element modeler and discretizer according to some example implementations.

Briefly returning to FIG. 1, the finite element modeler 102 may be configured to produce a finite element model of a structure in any of a number of different manners. FIG. 6 illustrates a finite element modeler 600 that according to some examples may correspond to the finite element modeler 102 in the system 100 of FIG. 1. As shown in FIG. 6 and with further reference to FIGS. 4, 5A, 5B and 5C, the finite element modeler may include a discretizer 602 and an interface element adder 604. The discretizer may be configured to perform a discretization of a digital model 500 of the structure to produce a finite element model 400, 510 in which each ply of the one or more plies is represented by a mesh 402 of finite elements 404, 512 aligned with a direction of uni-directional fibers embedded in the ply. The interface element adder, then, may be configured to add one or more fiber-aligned intraply interface elements 406, 516 between selected adjacent finite elements in the mesh of each ply, which again, may capture potential intraply failure modes for the FEM failure analysis. And in some examples in which the structure includes a plurality of plies, the interface element adder may be further configured to add an interply interface element between adjacent plies of each pair of adjacent plies in the plurality, and which may capture potential interply failure modes.

Figure 7:
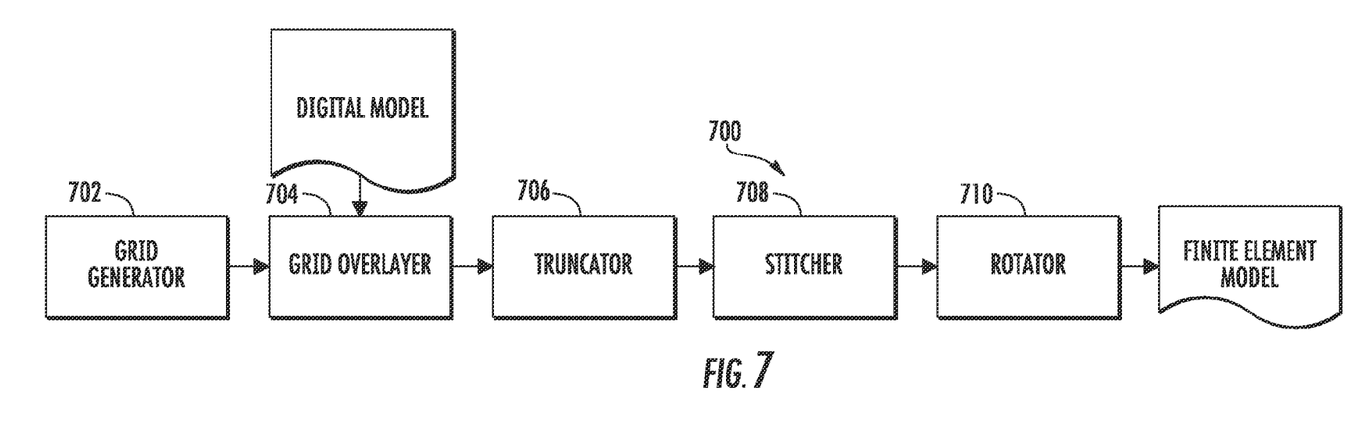

FIG. 7 illustrates a discretizer 700 that in some examples may correspond to the discretizer 602 of FIG. 6. As explained above, the discretizer may be configured to perform a discretization of a digital model of the structure to produce a finite element model in which each ply of the one or more plies is represented by a mesh of finite elements aligned with a direction of uni-directional fibers embedded in the ply. As shown in FIG. 7, the discretizer may include a grid generator 702, grid overlayer 704, truncator 706, stitcher 708 and rotator 710, the operations of which will now be described with reference to FIGS. 8A-8G.

Figure 8A:
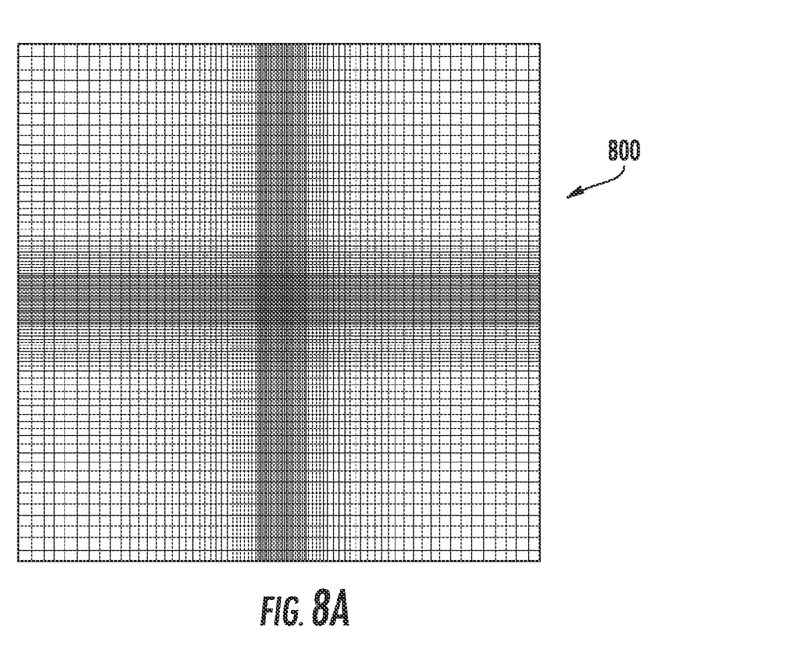
FIGS. 8A-8G illustrate various operations performed by elements of the discretizer of FIG. 7, according to some example implementations.
Figure 8B:
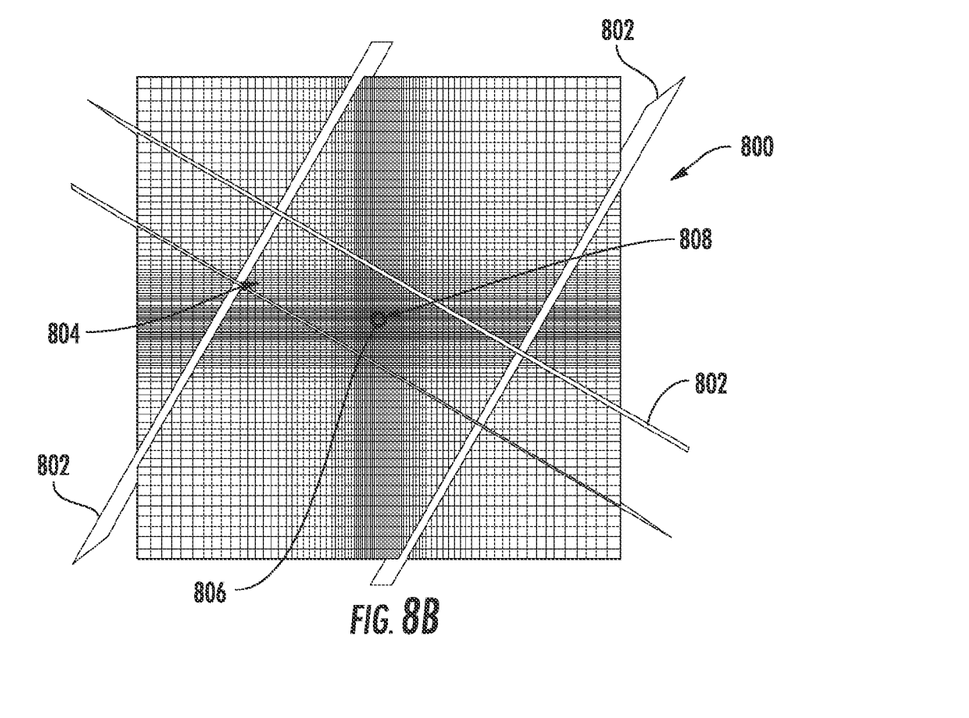

As shown in FIG. 8A, for each ply of the structure, the grid generator 702 may be configured to generate a grid of finite elements 800 each of which has edges aligned with directions of respective orthogonal axes of a global coordinate system (see, e.g., FIGS. 2, 3). For example, the grid may be generated such that the edges of its finite elements align in the $\Phi=0°$, 90° and through-thickness directions. The grid overlayer then may be configured to overlay the grid of finite elements with surfaces 802 that define a boundary 804 of the ply, as shown in FIG. 8B. Similarly, the grid overlayer may overlay the grid of finite elements with a surface 806 that defines a boundary 808 of any void (e.g., hole) in the ply. Here, the surfaces that define the boundary of the ply may be aligned at an angle that is the negative of any angular offset (e.g., $-\Phi$) of the principal axis of the local coordinate system from a corresponding one of the respective orthogonal axes of the global coordinate system.

The truncator 706 of the discretizer 700 may be configured to remove from the grid of finite elements 800 those elements that are at least partially outside the boundary 804 of the ply or at least partially inside the boundary 808 of any void, thereby producing a coarse mesh of the ply. The stitcher 708 may be configured to stitch the coarse mesh to the boundaries of the ply and any void to produce the mesh for the ply. And the rotator 710 may be configured to rotate the coarse mesh before the stitch, or the mesh after the stitch, by the angular offset (e.g., $\Phi$).

Figure 8C:
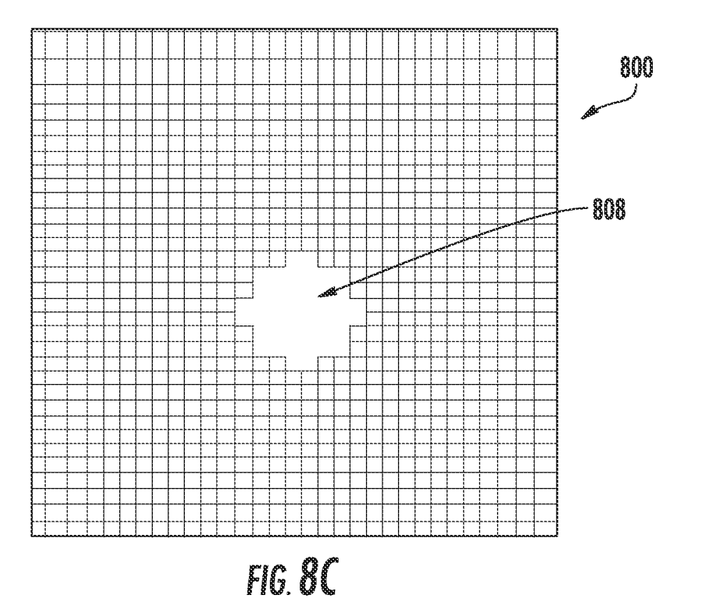
Figure 8D:
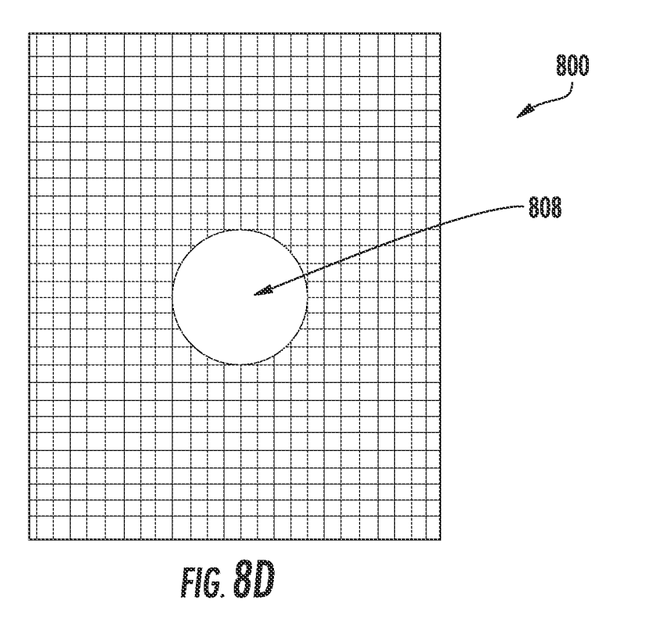
Figure 8E:
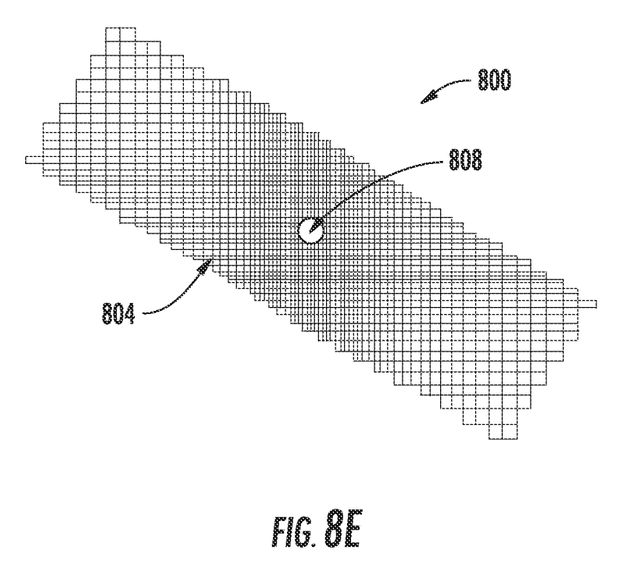
Figure 8F:
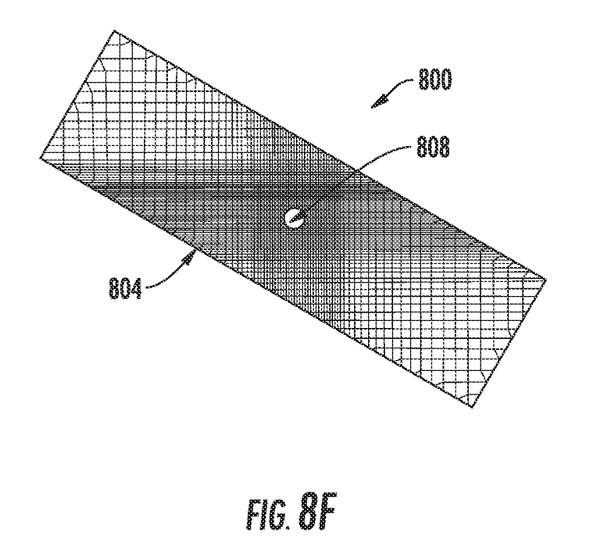
Figure 8G:
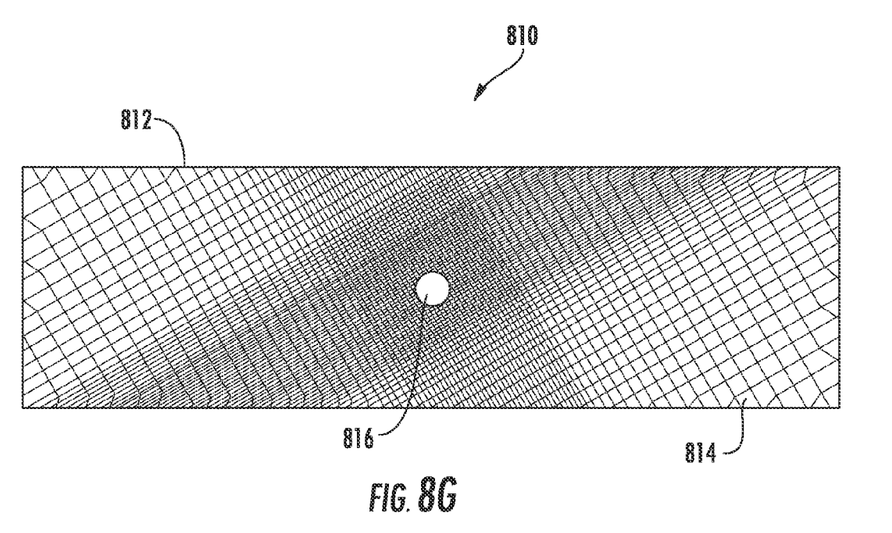

FIG. 8C illustrates a center portion of the grid 800 around the boundary 808 of the void in which the finite elements at least partially inside the boundary have been removed, and FIG. 8D illustrates the center portion after the rough area around the boundary of the void has been stitched. Similarly, FIG. 8E illustrates the grid around the boundary 804 of the ply in which the finite elements at least partially outside the boundary have been removed, and FIG. 8F illustrates the grid after the rough area around the boundary of the ply has been stitched. And FIG. 8G illustrates the grid after rotation by the angular offset, thereby producing finite element model 810 including a mesh 812 that represents the ply and includes a plurality of finite elements 814, and which defines a void such as a hole 816 (compare to FIG. 4).

Figure 9A:
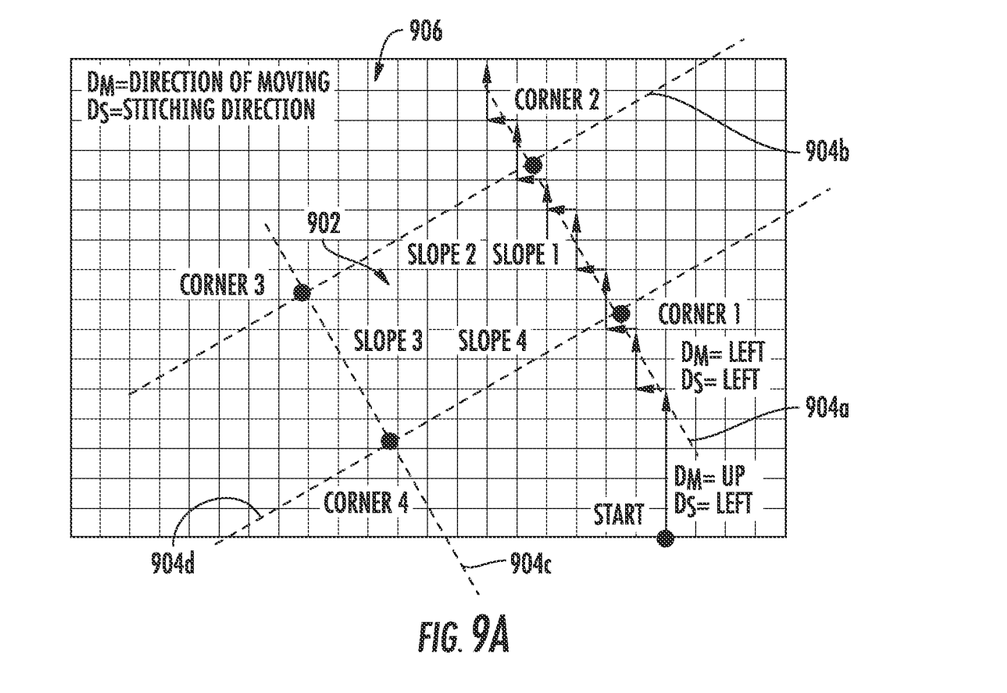
FIGS. 9A and 9B illustrate operations that may be performed to stitch a coarse mesh to the boundary of a ply, according to some example implementations.
Figure 9B:
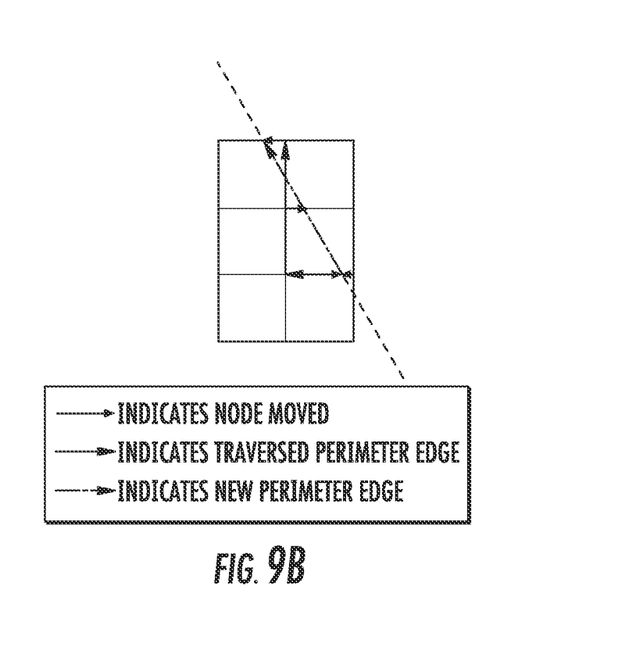

FIGS. 9A and 9B illustrate operations that may be performed by the stitcher 708 to carry out a process to stitch the coarse mesh to the boundary of a ply, according to some example implementations. As shown in FIG. 9, the stitcher may document a location of each corner and the slope of each edge of the boundary 902 of the ply defined by surfaces 904, including a first surface 904a, second surface 904b, third surface 904c, and fourth surface 904d, and which may be overlayed on a grid of finite elements 906. For purposes of illustration, it may be assumed that the process starts from a rightmost corner (e.g., largest value in x-direction), and that the process moves in a counterclockwise direction, although the process may start with other corners and move in other directions.

In some examples, the stitcher 708 may start at a point (labeled "Start") on the grid of finite elements 906, such as at a point past corner 1 along a bottom edge of the grid. The stitcher may travels upward until it crosses the first surface 904a. At that point, the stitcher may turns left until it again crosses the first surface. This process may continue until the stitcher reaches the opposing top edge of the mesh. The stitcher may then repeat the process for each of the second, third and fourth surfaces 904b, 904c, 904d.

As the stitcher 708 traverses each surface 904, the stitcher may maintain a record of its current direction of motion ($D_M$) and its stitching direction ($D_S$), both of which may be seeded at the start of a surface. The stitching direction may indicate the direction (up/down or left/right) that the FEM nodes may move so that they will lie on the boundary 902 of the ply. In instances in which the stitching direction is the same as the direction of motion, then nothing may happen. But in other instances in which the stitching direction is different from the direction of motion, the just-traversed FEM nodes along the direction of motion may be moved in the stitching direction to the associated surface. FIG. 9B illustrates how nodes maybe moved to create the boundary of the ply. In some examples, in instances which the stitcher crosses two or more elements in the stitching direction, the stitching direction may be changed and an additional two operations may be performed.

Figure 10:
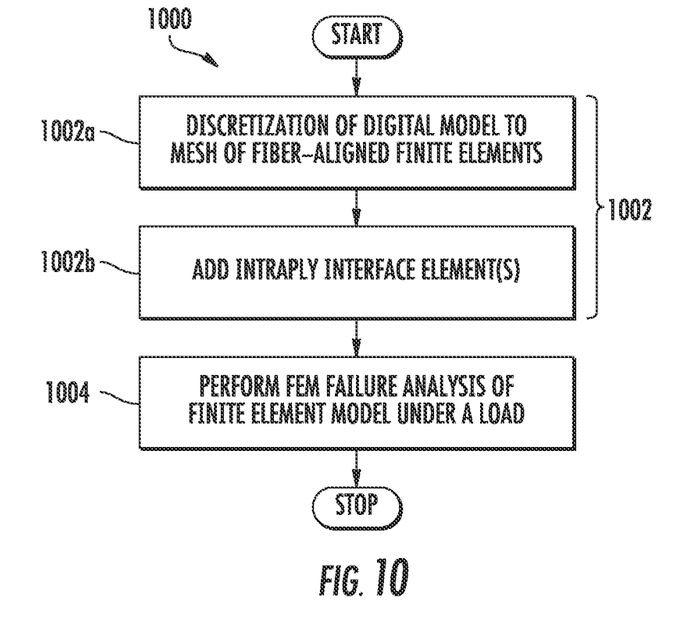
FIG. 10 is a flowchart illustrating various steps in a method according to some example implementations.

FIG. 10 is a flowchart illustrating various steps in a method 1000 of analyzing a structure according to some example implementations of the present disclosure. As shown at 1002, the method may include producing a finite element model of the structure including one or more plies. In this regard, producing the finite element model may include performing a discretization of a digital model of the structure in which each ply of the one or more plies is represented by a mesh of finite elements aligned with a direction of uni-directional fibers embedded in the ply, as shown at block 1002a. And as shown in block 1002b, producing the finite element model may include adding an intraply interface element may be between selected adjacent finite elements in the mesh of each ply to capture potential intraply failure modes, with the intraply interface element being aligned with the direction of the uni-directional fibers embedded in the ply. The method may then include performing a finite element method (FEM) failure analysis of the finite element model under a load, as shown in block 1004. And again, the FEM failure analysis may produce an output that indicates an extent of any of the potential intraply failure modes that result from the finite element model under the load.

According to example implementations of the present disclosure, the system 100 and its subsystems including the finite element modeler 102 and FEM failure analyzer 104 may be implemented by various means. Similarly, the examples of the finite element modeler 600 and discretizer 700, including each of their respective elements, may be implemented by various means according to example implementations. Means for implementing the systems, subsystems and their respective elements may include hardware, alone or under direction of one or more computer program code instructions, program instructions or executable computer-readable program code instructions from a computer-readable storage medium.

In some examples, one or more apparatuses may be provided that are configured to function as or otherwise implement one or more of the systems, subsystems or elements (e.g., system 100, finite element modeler 102, FEM failure analyzer 104, 600, discretizer 700). In examples involving more than one apparatus, the respective apparatuses may be connected to or otherwise in communication with one another in a number of different manners, such as directly or indirectly via a wireline or wireless network or the like.

Figure 11:
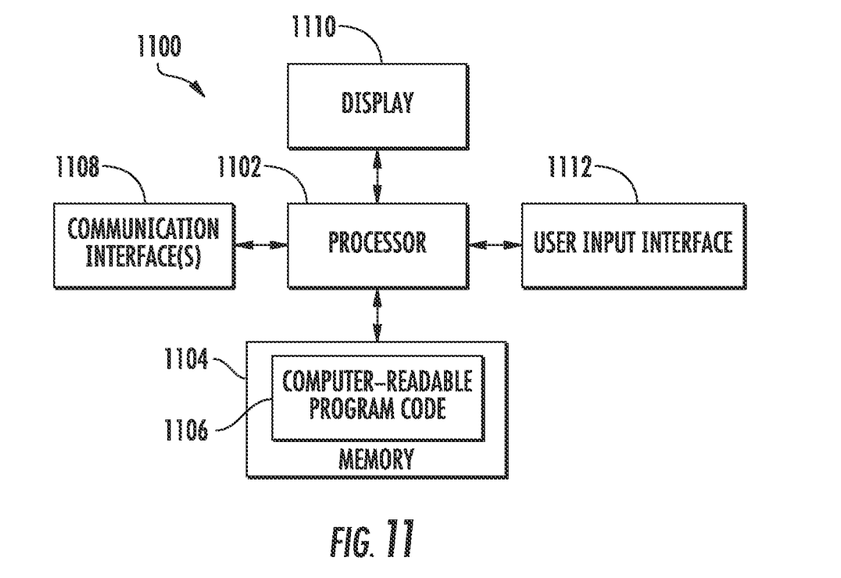
FIG. 11 illustrates an apparatus according to some example implementations.

FIG. 11 illustrates an apparatus 1100 according to some example implementations of the present disclosure. Generally, the apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 1102 connected to a memory 1104.

The processor 1102 is generally any piece of computer hardware that is capable of processing information such as, for example, data, computer-readable program code, instructions or the like (at times generally referred to as "computer programs," e.g., software, firmware, etc.), and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 1104 (of the same or another apparatus).

The processor 1102 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 1104 is generally any piece of computer hardware that is capable of storing information such as, for example, data, computer programs (e.g., computer-readable program code 1106) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory 1104, the processor 1102 may also be connected to one or more interfaces for displaying, transmitting and/or receiving information. The interfaces may include a communications interface 1108 and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display 1110 and/or one or more user input interfaces 1112. The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, mouse, joystick, touch-sensitive surface (e.g., touchpad, touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 1100 may include a processor 1102 and a computer-readable storage medium or memory 1104 coupled to the processor, where the processor is configured to execute computer-readable program code 1106 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for implementation of a system for analyzing a structure having fibers embedded therein, the apparatus comprising a processor and a memory storing executable instructions that in response to execution by the processor cause the apparatus to at least:
   produce a finite element model of the structure including one or more plies, including the apparatus being caused to at least:
      perform a discretization of a digital model of the structure in which each ply of the one or more plies is represented by a mesh of finite elements aligned with a direction of uni-directional fibers embedded in the ply; and
      add an intraply interface element between selected adjacent finite elements in the mesh of each ply to capture potential intraply failure modes, the intraply interface element being aligned with the direction of the uni-directional fibers embedded in the ply; and
   perform a finite element method (FEM) failure analysis of the finite element model under a load, the FEM failure analysis producing an output that indicates an extent of any of the potential intraply failure modes that result from the finite element model under the load.

2. The apparatus of claim 1, wherein the one or more plies are a plurality of plies at least two of which have respective uni-directional fibers in different directions.

3. The apparatus of claim 1, wherein the one or more plies are a plurality of plies, and the apparatus being caused to produce the finite element model further includes being caused to add an interply interface element between adjacent plies of each pair of adjacent plies in the plurality of plies to capture potential interply failure modes, and wherein the output of the FEM failure analysis further indicates an extent of any of the potential interply failure modes that result from the finite element model under the load.

4. The apparatus of claim 3, wherein the intraply interface element has one or more properties that are different from one or more properties of the interply interface element.

5. The apparatus of claim 1, wherein the digital model of the structure defines a void that extends through the each ply of the one or more plies, and the mesh of each ply defines a corresponding void therein, and
   wherein the apparatus being caused to add the intraply interface element includes being configured to add one or more intraply interface elements about the corresponding void in the mesh of each ply.

6. The apparatus of claim 5, wherein the finite elements of the mesh of each ply are aligned with the direction of the uni-directional fibers and without regard to the corresponding void in the mesh.

7. The apparatus of claim 1, wherein for each ply of the one or more plies, the direction of the uni-directional fibers is parallel to a principal axis of a local coordinate system of the ply, and the apparatus being caused to perform the discretization of the digital model includes being caused to at least:
   generate a grid of finite elements each of which has edges aligned with directions of respective orthogonal axes of a global coordinate system;
   overlay the grid of finite elements with surfaces that define a boundary of the ply, the surfaces being aligned at an angle that is the negative of any angular offset of the principal axis of the local coordinate system from a corresponding one of the respective orthogonal axes of the global coordinate system;
   remove from the grid of finite elements those elements that are at least partially outside the boundary of the ply, thereby producing a coarse mesh of the ply;
   stitch the coarse mesh to the boundary of the ply to produce the mesh for the ply; and
   rotate the coarse mesh before the stitch, or the mesh after the stitch, by the angular offset.

8. A method of analyzing a structure having fibers embedded therein, the method comprising:
   producing a finite element model of the structure including one or more plies, including:
      performing a discretization of a digital model of the structure in which each ply of the one or more plies is represented by a mesh of finite elements aligned with a direction of uni-directional fibers embedded in the ply; and
      adding an intraply interface element between selected adjacent finite elements in the mesh of each ply to capture potential intraply failure modes, the intraply interface element being aligned with the direction of the uni-directional fibers embedded in the ply; and
   performing a finite element method (FEM) failure analysis of the finite element model under a load, the FEM failure analysis producing an output that indicates an extent of any of the potential intraply failure modes that result from the finite element model under the load.

9. The method of claim 8, wherein the one or more plies are a plurality of plies at least two of which have respective uni-directional fibers in different directions.

10. The method of claim 8, wherein the one or more plies are a plurality of plies, and producing the finite element model further includes adding an interply interface element between adjacent plies of each pair of adjacent plies in the plurality of plies to capture potential interply failure modes, and
wherein the output of the FEM failure analysis further indicates an extent of any of the potential interply failure modes that result from the finite element model under the load.

11. The method of claim 10, wherein the intraply interface element has one or more properties that are different from one or more properties of the interply interface element.

12. The method of claim 8, wherein the digital model of the structure defines a void that extends through the each ply of the one or more plies, and the mesh of each ply defines a corresponding void therein, and
wherein adding the intraply interface element includes adding one or more intraply interface elements about the corresponding void in the mesh of each ply.

13. The method of claim 12, wherein the finite elements of the mesh of each ply are aligned with the direction of the uni-directional fibers and without regard to the corresponding void in the mesh.

14. The method of claim 8, wherein for each ply of the one or more plies, the direction of the uni-directional fibers is parallel to a principal axis of a local coordinate system of the ply, and performing the discretization of the digital model includes:
generating a grid of finite elements each of which has edges aligned with directions of respective orthogonal axes of a global coordinate system;
overlaying the grid of finite elements with surfaces that define a boundary of the ply, the surfaces being aligned at an angle that is the negative of any angular offset of the principal axis of the local coordinate system from a corresponding one of the respective orthogonal axes of the global coordinate system;
removing from the grid of finite elements those elements that are at least partially outside the boundary of the ply, thereby producing a coarse mesh of the ply;
stitching the coarse mesh to the boundary of the ply to produce the mesh for the ply; and
rotating the coarse mesh before the stitching, or the mesh after the stitching, by the angular offset.

15. A computer-readable storage medium that is non-transitory and has computer-readable program code portions stored therein that, in response to execution by a processor, cause an apparatus to at least:
produce a finite element model of the structure including one or more plies, including the apparatus being caused to at least:
perform a discretization of a digital model of the structure in which each ply of the one or more plies is represented by a mesh of finite elements aligned with a direction of uni-directional fibers embedded in the ply; and
add an intraply interface element between selected adjacent finite elements in the mesh of each ply to capture potential intraply failure modes, the intraply interface element being aligned with the direction of the uni-directional fibers embedded in the ply; and
perform a finite element method (FEM) failure analysis of the finite element model under a load, the FEM failure analysis producing an output that indicates an extent of any of the potential intraply failure modes that result from the finite element model under the load.

16. The computer-readable storage medium of claim 15, wherein the one or more plies are a plurality of plies at least two of which have respective uni-directional fibers in different directions.

17. The computer-readable storage medium of claim 15, wherein the one or more plies are a plurality of plies, and the apparatus being caused to produce the finite element model further includes being caused to add an interply interface element between adjacent plies of each pair of adjacent plies in the plurality of plies to capture potential interply failure modes, and
wherein the output of the FEM failure analysis further indicates an extent of any of the potential interply failure modes that result from the finite element model under the load.

18. The computer-readable storage medium of claim 17, wherein the intraply interface element has one or more properties that are different from one or more properties of the interply interface element.

19. The computer-readable storage medium of claim 15, wherein the digital model of the structure defines a void that extends through the each ply of the one or more plies, and the mesh of each ply defines a corresponding void therein, and
wherein the apparatus being caused to add the intraply interface element includes being configured to add one or more intraply interface elements about the corresponding void in the mesh of each ply.

20. The computer-readable storage medium of claim 19, wherein the finite elements of the mesh of each ply are aligned with the direction of the uni-directional fibers and without regard to the corresponding void in the mesh.

21. The computer-readable storage medium of claim 15, wherein for each ply of the one or more plies, the direction of the uni-directional fibers is parallel to a principal axis of a local coordinate system of the ply, and the apparatus being caused to perform the discretization of the digital model includes being caused to at least:
generate a grid of finite elements each of which has edges aligned with directions of respective orthogonal axes of a global coordinate system;
overlay the grid of finite elements with surfaces that define a boundary of the ply, the surfaces being aligned at an angle that is the negative of any angular offset of the principal axis of the local coordinate system from a corresponding one of the respective orthogonal axes of the global coordinate system;
remove from the grid of finite elements those elements that are at least partially outside the boundary of the ply, thereby producing a coarse mesh of the ply;
stitch the coarse mesh to the boundary of the ply to produce the mesh for the ply; and
rotate the coarse mesh before the stitch, or the mesh after the stitch, by the angular offset.

* * * * *